Nov. 21, 1933.   O. BARNACK   1,936,322
PHOTOGRAPHIC DEVICE
Filed Aug. 17, 1932
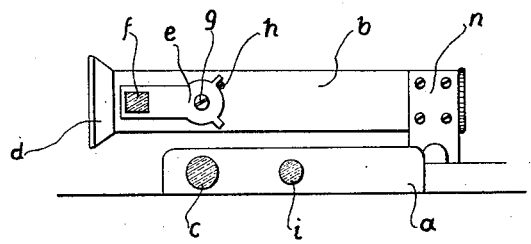
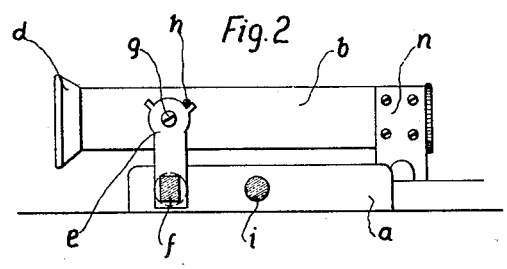
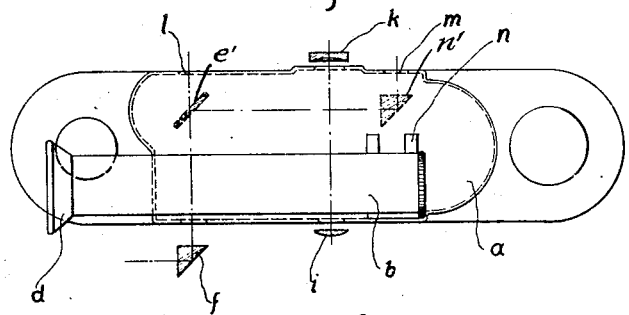
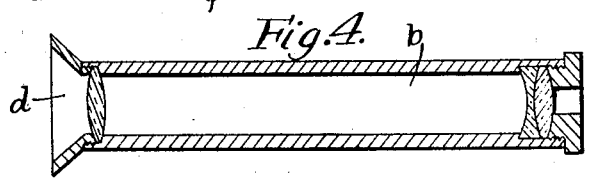
INVENTOR
Oskar Barnack
BY
George C. Heinrich
ATTORNEY Patented Nov. 21, 1933

1,936,322

UNITED STATES PATENT OFFICE

1,936,322

PHOTOGRAPHIC DEVICE

Oskar Barnack, Wetzlar, Germany, assignor to Ernst Leitz, Optische Werke, G. m. b. H., Wetzlar, Germany Application August 17, 1932, Serial No. 629,115, and in Germany September 10, 1931

1 Claim. (Cl. 88—2.6)

This invention relates to improvements in photographic cameras, and it is the principal object of my invention to provide a camera by means of which pictures of a person may be made without that this person is aware of this fact or the manipulation of the distance meter, thus producing pictures of the person in an unassumed pose.

Another object of my invention is the provision of a photographic camera equipped with an angle finder allowing a sidewise use of the camera.

A further object of my invention is the provision of a camera the angle finder of which is provided with a prism carrier pivoted to the finder so as to allow the swinging of the prism in front of the sight opening of the distance meter permitting a sidewise inspection of the angle finder and the distance meter.

These and other objects and advantages of my invention will become more fully known as the description proceeds, and will then be more specifically defined in the appended claim.

In the accompanying drawing forming a material part of this disclosure:

Fig. 1 is a side elevation of an angle finder of a distance meter equipped with a prism holder constructed according to my invention in its position of rest.

Fig. 2 is a view similar to Figure 1 with the prism holder in operative position.

Fig. 3 is a plan view of a camera equipped with a distance meter and finder, constructed according to my invention.

Fig. 4 is a longitudinal section through the range finder tube.

As illustrated, a distance meter basis $a$, $l$, $m$, is equipped with a finder telescope $i$, $k$, and an angle finder composed of the tube $b$ the lens $d$ and bracket $n$, designated as a whole arranged on top of a camera and while not directed to the field of view of the camera lens enabling a lateral use thereof. The detached lenses $i$, $k$ are diagrammatically indicating a finder telescope, and are supported and connected to the camera in any well known manner. $m$ and $n'$ are the stationary or the movable mirrors of a distance meter within the camera, and $k$ indicates the lens of a range finder or telescope arranged at an angle of 90° to both mirrors.

A reflection prism $f$ is arranged in a suitable holder $e$ pivotally or turnably secured, as at $g$ to the angle finder $b$.

At its inner end the holder $e$ is equipped with stops adapted to engage a stop pin $h$ adapted to be engaged by the stops to limit the movements of the holder in either direction.

In operation, the prism and its holder are turned about the pivot point in order to bring the prism in front of the sight opening of the distance meter and thus allowing a lateral inspection of the angle finder as well as of the distance meter so that while the objective is directed to the person to be photographed the operator looks at an angle on this person and the same will not be aware of the fact that a picture is being made and of the operation of the distance meter permitting the making of pictures of persons in an unassumed pose.

It will be understood that I have described and shown the preferred form of my invention only as one example of the many possible ways to practically construct my invention and that I may make such changes in the general arrangement thereof and in the construction of its minor details as come within the scope of the appended claims without departure from the spirit of my invention and the principles involved.

Having thus described my invention, what I claim as new, and desire to secure by Letters Patent is:

In a photographic camera including a distance meter and its window, an angle finder held on top of said camera, enabling its sidewise use, a holder pivotally secured to said finder, a prism arranged in said holder adapted to be brought in front of the window of said distance meter to allow a simultaneous lateral observation through the angle finder and the distance meter, the objective of the camera directed upon the person to be photographed, the camera operator looking at an angle to said person.

OSKAR BARNACK.